US012700734B2

(12) United States Patent
Yasa

(10) Patent No.: US 12,700,734 B2
(45) Date of Patent: Aug. 4, 2026

(54) CONVERTER, METHOD OF INSTALLING A POWER SYSTEM, AND USE OF A CONVERTER

(71) Applicant: HITACHI ENERGY LTD, Zurich (CH)

(72) Inventor: Ugur Yasa, Brussels (BE)

(73) Assignee: HITACHI ENERGY LTD, Zurich (CH)

( * ) Notice: Subject to any disclaimer, the term of this patent is extended or adjusted under 35 U.S.C. 154(b) by 352 days.

(21) Appl. No.: 18/008,690

(22) PCT Filed: Jun. 21, 2021

(86) PCT No.: PCT/EP2021/066888
§ 371 (c)(1),
(2) Date: Dec. 7, 2022

(87) PCT Pub. No.: WO2021/259882
PCT Pub. Date: Dec. 30, 2021

(65) Prior Publication Data
US 2023/0216281 A1 Jul. 6, 2023

(30) Foreign Application Priority Data
Jun. 23, 2020 (EP) ..................................... 20181561

(51) Int. Cl.
*H02J 3/01* (2026.01)
*H02J 3/1857* (2026.01)
(Continued)

(52) U.S. Cl.
CPC .............. *H02J 3/01* (2013.01); *H02J 3/1857* (2013.01); *H02M 1/12* (2013.01); *H02M 7/003* (2013.01)

(58) Field of Classification Search
CPC .......... H02J 3/01; H02J 3/1842; H02J 3/1857; H02J 3/28; H02J 3/32; H02J 2310/10;
(Continued)

(56) References Cited

U.S. PATENT DOCUMENTS

| | | | |
|---|---|---|---|
| 7,078,831 B2 * | 7/2006 | Ferraro | H02J 3/1835 |
| | | | 307/105 |
| 9,407,133 B1 * | 8/2016 | Alexander | H02M 7/797 |

(Continued)

FOREIGN PATENT DOCUMENTS

| | | |
|---|---|---|
| CN | 108307670 A | 7/2018 |
| CN | 106229977 B | 8/2018 |

(Continued)

OTHER PUBLICATIONS

Zacharis et al., "Power electronic interfaces for low voltage residential networks," 2013 15th European Conference on Power Electronics and Applications (EPE), Lille, France, 2013, pp. 1-10, doi: 10.1109/EPE.2013.6631938. (Year: 2013).*
(Continued)

*Primary Examiner* — Fred E Finch, III
(74) *Attorney, Agent, or Firm* — Sage Patent Group

(57) ABSTRACT

A converter comprises a housing having a mounting structure for mounting the converter to a DIN rail. A converter circuit is disposed within the housing and comprises one or several wide-bandgap semiconductor based active switching element(s). The converter circuit is adapted to perform a total harmonic voltage distortion measurement and to perform a control function based thereon.

19 Claims, 4 Drawing Sheets

(51) Int. Cl.
    *H02M 1/12* (2006.01)
    *H02M 7/00* (2006.01)
(58) Field of Classification Search
    CPC ................ H02J 2310/12; H02M 1/12; H02M 1/42–4291; H02M 7/003
    See application file for complete search history.

(56) References Cited

U.S. PATENT DOCUMENTS

| | | | | |
|---|---|---|---|---|
| 2002/0064017 A1* | 5/2002 | Karol | ..................... | H05K 7/209 |
| | | | | 361/274.3 |
| 2014/0015321 A1* | 1/2014 | Nordin | ................... | H02J 1/001 |
| | | | | 307/43 |
| 2018/0248470 A1 | 8/2018 | Gataric | | |
| 2019/0157984 A1* | 5/2019 | Aloni | ........................ | H02J 3/38 |
| 2019/0178923 A1* | 6/2019 | Shao | ..................... | G01R 23/15 |
| 2019/0238046 A1 | 8/2019 | Kawashima et al. | | |
| 2020/0028352 A1* | 1/2020 | Strouse | ................ | H05K 7/1457 |
| 2023/0223751 A1* | 7/2023 | Holcombe | ............ | H02M 1/322 |
| | | | | 307/18 |

FOREIGN PATENT DOCUMENTS

| | | |
|---|---|---|
| CN | 108736752 A | 11/2018 |
| CN | 210007392 U | 1/2020 |
| EP | 0688092 A2 | 12/1995 |

OTHER PUBLICATIONS

"Technical principles of electronic housings," Phoenix Contact Group, Blomberg, Germany, 2019. Accessed: Feb. 28, 2025. Available: https://assets.phoenixcontact.com/file/fcda5126-466b-41d4-827d-91d1a2e9bfad/media/original?1082999_EN_HQ_HOUSING_Basics_LoRes.pdf (Year: 2019).*

"The Authoritative Dictionary of IEEE Standards Terms, Seventh Edition," in IEEE Std 100-2000, entry for "total harmonic distortion", p. 1191, Dec. 11, 2000. (Year: 2000).*

International Search Report and Written Opinion of the International Searching Authority, PCT/EP2021/066888, mailed Jul. 30, 2021, 18 pages.

Anonymous: "Active Harmonic Filter Enerdoor : EMI Filters and RFI Filters", Jun. 7, 2019 (Jun. 7, 2019)XP055753881, Retrieved from the Internet: URL:https://web.archive.org/web/20190607233000/https://www.enerdoor.com/category/act ive-harmonic-filter, retrieved on Nov. 25, 2020, 5 pages.

Anonymous: "Wide-bandgap semiconductor—Wikipedia", May 5, 2020 (May 5, 2020), XP055825502, Retrieved from the Internet: URL:https://en.wikipedia.org/w/index.php?title=Wide-bandgap semi-conductor&oldid=9549 24650, retrieved on Jul. 19, 2021, 7 pages.

Ku Xiao-Yan et al: "Study on Hybrid Filtering Solution for Marine Electric Network", Polish Maritime Research, [Online] vol. 17. No. 2, Jan. 2, 2010 (Jan. 2, 2010) XP055825305, Warsaw, ISSN: 1233-2585, DOI: 10.2478/v10012-010-0021-4, Retrieved from the Internet: URL:https://sciendo.com/downloadpdf/journa ls/pomr/17/2/article-p72.pdf>, [retrieved on Jul. 19, 2021], 7 pages.

Anonymous: "Functional Devices introduces self-powered wireless current sensor", Dec. 15, 2009 (Dec. 15, 2009), XP055753808, Retrieved from the Internet: URL:https://www.automation.com/en-us/products/product15/functional-devices-introduce s-self-powered-wireles, [retrieved on Nov. 25, 2020].

European Office Action, European Patent Application No. 20181561.0, mailed Apr. 5, 2023, 8 pages.

Lee, et al., "Hybrid Active Filter with Variable Conductance for Harmonic Resonance Suppression in Industrial Power Systems", Aalborg Universitet, IEEE Transactions on Industrial Electronics, 2015, 13 pages.

Office Action, CN Patent Application No. 202180045090.4, mailed May 14, 2026, 12 pages.

* cited by examiner

30

32          33

$V_{in}$          $V_{out}$

IC(s)          V(t)

31

30

35

34

36

V(t)          31          ctrl

CONVERTER, METHOD OF INSTALLING A POWER SYSTEM, AND USE OF A CONVERTER

CROSS REFERENCE TO RELATED APPLICATIONS

This application is a 35 U.S.C. § 371 national stage application of PCT International Application No. PCT/EP2021/066888 filed on Jun. 21, 2021, which in turn claims priority to European Patent Application No. 20181561.0, filed on Jun. 23, 2020, the disclosures and content of which are incorporated by reference herein in their entireties.

TECHNICAL FIELD

The present disclosure relates to converters and methods of providing power systems comprising converters, and in particular to converters for use in active harmonic filtering, power factor correction, load balancing, or battery energy storage.

BACKGROUND

Converters are used in low voltage power quality and energy storage applications. Typically, converters in such application include Si-based active switching elements and have an input for a wired connection with a current transformer or other element that can provide a total harmonic current distortion, THiD, measurement, that is used for control purposes.

Various drawbacks are associated with such techniques. The Si-based active switching elements cause the converter to have a comparatively large size, which severely limits the flexibility of mounting the converter. For illustration, dedicated panels or dedicated standing cabinets may be required to implement an active harmonics filter for power applications (such as car battery charging and discharging or in mid-size or small industrial power supply). When a wired connection to a current transformer is required, specialized technical personnel are required for sizing, installation and/or commissioning due to the complexity of the connections required to operate the system. Special tools and authorized personnel are required to install and operate the converter. This makes planning and installation of active harmonic filters, power factor correction circuits, load balancing circuits, or battery energy storage systems more challenging, error-prone, and time-consuming.

For further illustration, it may be difficult to install a current transformer to a busbar of an energized installation. This makes it challenging to install current transformers that could provide feedback downstream of feeders. One or several current transformers may be available on a main feeder downstream side of a distribution transformer, but it is rare for a current transformer to be installed on a downstream side of individual feeders. This makes the provision of de-centralized converter arrangement problematic when using a conventional converter, due to the lack of proper feedback from an associated current transformer.

SUMMARY

There is a need to provide improved converters and methods for installing power systems for active harmonic filtering, power factor correction, load balancing, or battery energy storage. There is in particular a need for converters that can be installed more easily and allow the footprint of cabinets to be decreased as compared to conventional techniques. Alternatively, or additionally, there is a need for converters that can be installed in a decentralized manner, e.g., on a downstream side of individual feeders.

According to embodiments, a converter and method of installing a power system are provided.

The converter is a wide-bandgap semiconductor based converter having one or several active switching elements implemented by wide-bandgap semiconductor based components. The converter has a mounting structure for mounting to a DIN (Deutsche Institut für Normung) rail. The converter does not require inputs for a wired connection to a current transformer or other components that provides a total harmonic current distortion, THiD, measurement.

The wide-bandgap semiconductor may be SiC or GaN.

The converter can be a converter for low voltage (LV) switchgear.

As used herein, the term "DIN rail" broadly refers to standardized rails including rails according to EN 60715 (such as DIN EN 60715:2018-07 or DIN EN 60715:2001-09), EN 50035, BS 5825, or DIN 46277-1.

A converter comprises a housing having a mounting structure for mounting the converter to a DIN rail. The converter comprises a converter circuit disposed within the housing and comprising one or several wide-bandgap semiconductor based active switching element(s), wherein the converter circuit is adapted to determine a total harmonic voltage distortion, THvD, and to perform a control function based on the determined THvD.

All active switching element(s) of the converter circuit may be wide-bandgap semiconductor based.

All active switching element(s) of the converter circuit may be SiC- or GaN-based semiconductor switches.

The converter circuit may be an AC/DC, DC/AC, AC/AC, or DC/DC converter circuit.

The control function may comprise controlling switching of the wide-bandgap semiconductor (e.g., SiC- or GaN-) based active switching element(s).

The control function may comprise one or several of performing an active harmonic filter, power factor correction, load balancing, energy storage control.

The converter may comprise at least one integrated circuit adapted to receive a time-dependent voltage and to compute the THvD.

The at least one integrated circuit may be adapted to receive a time-dependent voltage for each one of three phases and compute the THvD therefrom.

The at least one integrated circuit may be adapted to generate one or several control signals based on the computed THvD to perform the control function.

The converter circuit may comprise a wireless interface.

The wireless interface may comprise a Bluetooth, Bluetooth Low Energy or Wi-Fi interface.

The wireless interface may be adapted to output data for outputting via a human-machine interface.

The wireless interface may be adapted to receive a current measurement or a total harmonic current distortion, THiD, measurement.

The converter may be adapted to control switching of the wide-bandgap semiconductor based active switching element(s) based on the THiD measurement.

The converter may be adapted for performing power factor correction (PFC).

The converter circuit may comprise a control circuit adapted to control switching of the wide-bandgap semiconductor based active switching element(s) based on the determined THvD.

The control circuit may be adapted to control switching of the wide-bandgap semiconductor based active switching element(s) independently of a total harmonic current distortion, THiD, measurement.

The control circuit may comprise or be one or several integrated circuits.

The converter may be a bidirectional converter.

The converter may be adapted for being electrically connected downstream of a feeder.

The converter may be adapted for being electrically connected to a low voltage (LV) main busbar or LV sub busbar.

The mounting structure may be adapted for mechanical engagement with a DIN rail selected from a group consisting of a top hat rail, a C section rail, a G section rail.

The mounting structure may be adapted for mechanical engagement with both a first DIN rail and a second DIN rail, the first and second DIN rails being different from each other and both the first and the second DIN rail being selected from the group consisting of a top hat rail, a C section rail, a G section rail.

The mounting structure may be adapted for releasable engagement with a DIN rail.

The mounting structure may comprise an elastically deformable component, in particular made from plastic, for releasable engagement with a DIN rail.

The mounting structure may be adapted for a snap fit connection with the DIN rail.

The mounting structure may be adapted to allow reversible, destruction-free removal of the connector from the DIN rail and re-attachment to the DIN rail.

The converter may have a switching frequency of 10 kHz or more or 40 kHz or more.

The converter may be adapted for active harmonic frequency filtering harmonics including the $100^{th}$ harmonic or more, the $250^{th}$ harmonic or more, or even higher harmonics.

The converter may not have any terminals for a wired connection for receiving a current measurement or a THiD measurement.

An active harmonic filter, power factor correction circuit, load balance circuit, or battery energy storage system may comprise a DIN rail and the converter according to an embodiment mounted on the DIN rail.

The converter may be installed in a wall-mounted cabinet.

The converter may be electrically connected downstream of a feeder.

The converter may be electrically connected to a low voltage (LV) main busbar or LV sub busbar.

According to another embodiment, there is provided a cabinet comprising at least one DIN rail and at least one converter according to an embodiment releasably engaged with the at least one DIN rail.

The cabinet may be wall-mounted.

A power system according to an embodiment may comprise a bus, a plurality of loads coupled to the bus, and a plurality of converters according to embodiments of the invention connected to the plurality of loads.

The bus may be a low voltage (LV) main busbar or LV sub busbar.

The power system may comprise a distribution transformer. The bus may be at a low-voltage side of the distribution transformer.

A method of providing an active harmonic filter, power factor correction circuit, load balance circuit, or battery energy storage system comprises providing a DIN rail. The method comprises mounting a converter to the DIN rail. The converter comprises a housing comprising a mounting structure, and a converter circuit disposed within the housing and comprising wide-bandgap semiconductor based active switching elements, wherein the converter circuit is adapted to determine a total harmonic voltage distortion, THvD, and use the determined THvD for performing a control function. Mounting the converter to the DIN rail may comprise engaging the mounting structure with the DIN rail.

The converter may be the bidirectional converter according to an embodiment.

In the method, all active switching element(s) of the converter circuit may be wide-bandgap semiconductor based. The active switching element(s) of the converter circuit may be SiC- or GaN-based.

In the method, the converter circuit may be an AC/DC, DC/AC, AC/AC, or DC/DC converter circuit.

The method may comprise controlling switching of the one or more first wide-bandgap semiconductor based active switching element(s).

The method may comprise receiving, by at least one integrated circuit, a time-dependent voltage and to computing the THvD by the at least one integrated circuit.

The method may comprise receiving, by at least one integrated circuit, a time-dependent voltage for each one of three phases and computing the THvD therefrom.

The method may comprise generating, by at least one integrated circuit, one or several control signals based on the computed THvD to perform the control function.

The method may comprise performing a control function that comprises one or several of performing an active harmonic filter, power factor correction, load balancing, energy storage control.

In the method, the converter circuit may comprise a wireless interface.

The wireless interface may comprise a Bluetooth, Bluetooth Low Energy or WIFI interface.

The method may comprise transmitting, via the wireless interface, data for outputting via a human-machine interface.

The method may comprise receiving, via the wireless interface, a current measurement or a total harmonic current distortion, THiD, measurement.

The method may comprise controlling switching of the wide-bandgap semiconductor based active switching element(s) based on the THiD measurement.

The method may comprise performing power factor correction (PFC).

The converter circuit may comprise a control circuit, and the method may comprise controlling switching of the wide-bandgap semiconductor based active switching element(s) based on the determined THvD.

The control circuit may comprise or be one or several integrated circuits.

The method may comprise controlling switching of the wide-bandgap semiconductor based active switching element(s) independently of a total harmonic current distortion, THiD, measurement.

The converter used in the method may be a bidirectional converter.

The converter may be electrically connected downstream of a feeder.

The converter may be electrically connected to a low voltage (LV) main busbar or LV sub busbar.

The method may comprise mechanically engaging the mounting structure with a DIN rail selected from a group consisting of a top hat rail, a C section rail, a G section rail.

The mounting structure may be adapted for mechanical engagement with both a first DIN rail and a second DIN rail, the first and second DIN rails being different from each other and both the first and the second DIN rail being selected from the group consisting of a top hat rail, a C section rail, a G section rail.

The method may comprise releasably mechanically engaging with a DIN rail.

The mounting structure may comprise an elastically deformable component, in particular made from plastic, for releasable engagement with a DIN rail.

The mounting structure may be adapted for a snap fit connection with the DIN rail.

The mounting structure may be adapted to allow reversible, destruction-free removal of the connector from the DIN rail and re-attachment to the DIN rail.

The method may comprise switching the wide-bandgap semiconductor based active switching elements with a switching frequency of 10 kHz or more or of 40 kHz or more.

The method may comprise performing active harmonic frequency filtering for harmonics including the $100^{th}$ harmonic or more, the $250^{th}$ harmonic or more, or even higher harmonics.

The converter may not have any terminals for a wired connection for receiving a current measurement or a THiD measurement.

Mounting the converter may comprise mounting the converter in a wall-mounted cabinet.

According to another embodiment, there is provided a method of using the converter according to an embodiment in an active harmonic filter, power factor correction circuit, load balance circuit, or battery energy storage system.

The use may comprise electrically connecting the converter downstream of a feeder.

The use may comprise electrically connecting the converter to a low voltage (LV) main busbar or LV sub busbar.

The use may comprise installing a plurality of converters close to loads in a decentralized converter arrangement.

The converter according to an embodiment may be used for reducing a footprint of the active harmonic filter, power factor correction circuit, load balance circuit, or battery energy storage system.

The converter according to an embodiment may be used for increasing a switching frequency and/or reducing dissipation in the converter circuit.

The converter can be a converter for low voltage (LV) switchgear.

Various embodiments may provide the following effects and advantages. The active switching elements of wide-bandgap semiconductor (e.g., SiC or GaN) based converters are switchable at high frequencies of, e.g., equal to or more than 10 kHz or equal to or more than 40 kHz. Higher harmonics can be filtered. This allows the passive components (such as inductivities, capacities, and/or resistivities) to be made smaller. The converter circuit can be accommodated into a DIN-rail type plastic box, which provides ease of mounting. No wired connection to a current transformer is required, which further enhances ease of installation and/or allows the converter to be positioned close to a load that causes pollution. When current measurements or THiD measurements are used, as may be the case in PFC applications, the required current measurements or THiD measurements can be received via a wireless interface. The wider filtering spectrum attainable with a wide-bandgap semiconductor based converter allows THiD characteristics to be improved.

The converter lends itself to de-centralized applications throughout low voltage switchgear. By positioning the converter (or the active filtering circuit in which it is used)

closer to the load, filtering efficiency can be improved. The de-centralized applications throughout low voltage switchgear are facilitated by the fact that no wired connections to a current transformer are required for the converter to operate.

No special rail and/or cabinet design is required for mounting the converter. This enhances interoperability and reduces installation complexity. The converter lends itself to being readily integrated into a switchgear in, e.g., low voltage applications, such as residential applications or mid- or small-scale industrial applications.

BRIEF DESCRIPTION OF THE DRAWINGS

The subject-matter of the present disclosure will be explained in more detail with reference to preferred exemplary embodiments which are illustrated in the attached drawings, in which.

DETAILED DESCRIPTION

Exemplary embodiments of the present disclosure will be described with reference to the drawings in which identical or similar reference signs designate identical or similar elements. While some embodiments will be described in the context of converters in wall-mounted cabinets for active harmonic filtering and/or energy storage, the invention is not limited thereto.

Figure 1:
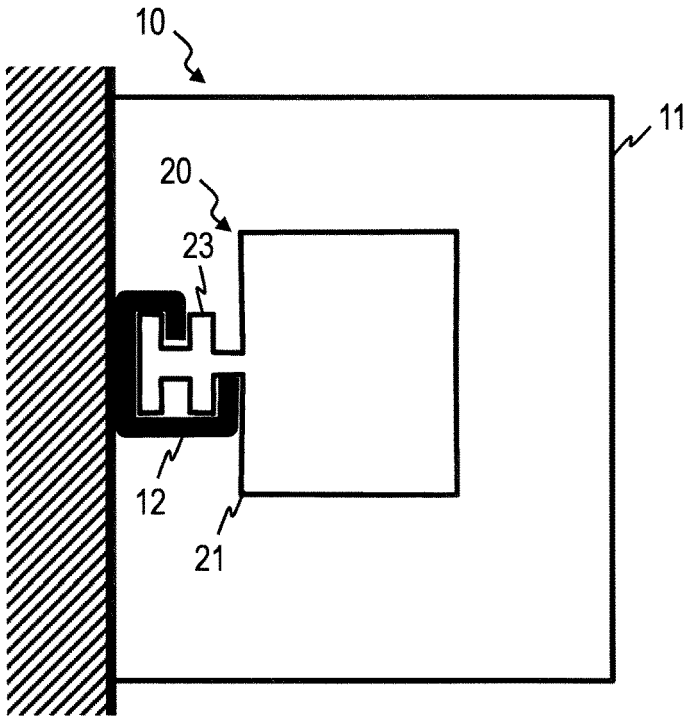
FIG. 1 is a schematic cross-sectional view of a converter according to an embodiment mounted to a DIN rail.

FIG. 1 is a cross-sectional view of a converter 20 according to an embodiment. The converter 20 has a housing 21. The housing 21 has a mounting structure 23. The mounting structure 23 is adapted for mechanical engagement with a DIN rail. The mounting structure 23 may be adapted for mechanical engagement with at least one and preferably several types of DIN rails, which may be selected from top hat rails, G section rails, C section rails. The mounting structure 23 may be adapted for mechanical engagement with at least one and preferably several types of DIN rails according to EN 60715 (such as DIN EN 60715:2018-07 or DIN EN 60715:2001-09), EN 50035, BS 5825, or DIN 46277-1.

A converter circuit is housed within the housing 20. As will be explained in more detail with reference to FIGS. 3 to 5, the converter circuit includes wide-bandgap semiconductor based active switching elements. Preferably, all active switching elements of the converter 20 are implemented as wide-bandgap semiconductor based semiconductor switches. For illustration, active switching elements of the converter circuit can be implemented as SiC- or GaN-based active switching elements.

Wide-bandgap semiconductor based switching elements can be switched at higher frequencies than, e.g., Si-based semiconductor switches. The higher switching frequency allows passive components, such as the inductances and/or capacitances of a resonance circuit and/or resistances to have smaller dimensions. The footprint of the converter circuit can be reduced when wide-bandgap semiconductor based semiconductor switches are used, as compared to a converter that has Si-based semiconductor switches as active switching elements. This allows all converter components to be accommodated in a conventional housing 21 for mounting to a DIN rail.

The converter circuit is also adapted to use a total harmonic voltage distortion, THvD, measurement for performing control functions, such as controlling the timing with which the active wide-bandgap semiconductor based switching elements are switched to attain a desired active harmonic filtering, load balancing, and/or energy storage management.

The mounting structure 23 may be made from plastic. The mounting structure 23 may be adapted for mounting to the DIN rail 12 via a snap-fit connection. The mounting structure 23 may include one or several resiliently deformable fingers that allow the mounting structure 23 to engage with the DIN rail 23 in such a manner that the housing 20 can be removed from the DIN rail in a destruction-free manner by disengaging the mounting structure 23 from the DIN rail 12.

Figure 2:
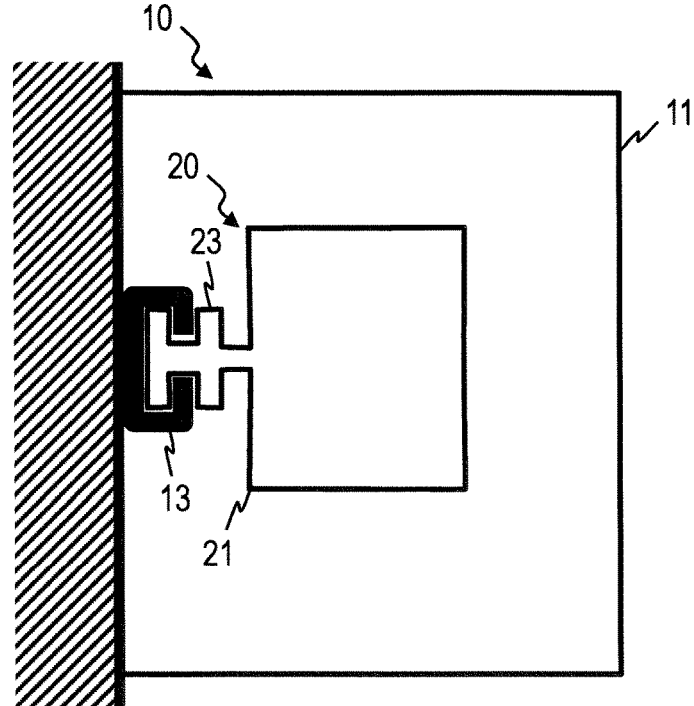
FIG. 2 is a schematic cross-sectional view of the converter of FIG. 1 mounted to another DIN rail.

The mounting structure 23 may be adapted to removably engage DIN rails 12, 13 of different types, such as a G-section DIN rail (as shown in FIG. 1) and a C-section DIN rail (as shown in FIG. 2). The mounting structure may comprise at least four resiliently deformable fingers that allow the mounting structure 23 to engage with DIN rails 12, 13 of different types.

Figure 3:
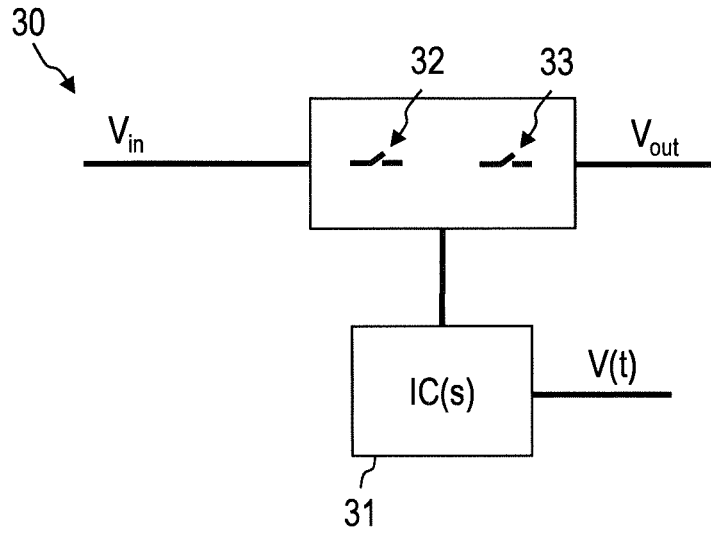
FIG. 3 is a circuit diagram of a converter circuit of a converter according to an embodiment.

FIG. 3 is a schematic representation of a converter circuit 30 according to an embodiment. Converter circuits of various converter topologies may be provided. Preferably, all active switching elements of the converter circuit 30 are implemented as wide-bandgap semiconductor based semiconductor switches. All active switching elements of the converter circuit 30 can be implemented as SiC- or GaN-based active switching elements.

The converter circuit 30 may have several wide-bandgap semiconductor based semiconductor switching elements 32, 33.

The wide-bandgap semiconductor based semiconductor switching elements 32, 33 may be controlled by a control circuit, which may include one or several integrated circuit(s) 31. The IC(s) 31 may be implemented by any one or any combination of a processor, a microprocessor, a controller, a microcontroller, an application specific integrated circuit (ASIC), a field programmable gate array (FPGA) or several one of these elements in any combination. The IC(s) 31 may be adapted to control switching of the wide-bandgap semiconductor based semiconductor switching elements 32, 33 responsive to a determined THvD. The THvD measurement may be obtained locally within the housing 21 of the converter 20, so that no external connections are required.

Processing of voltage measurements for obtaining the THvD may be performed by the IC(s) 31. The IC(s) 31 may receive a voltage signal V(t) for each one of the three phases and may process the voltage signal V(t) to compute the THvD.

The control logic for switching the wide-bandgap semiconductor based semiconductor switching elements 32, 33 may vary depending on the power system in which the converter 20 is being used. The IC(s) 31 may control the wide-bandgap semiconductor based semiconductor switching elements 32, 33 of the converter circuit so as to perform active harmonic filtering, load balancing, energy storage management, without being limited thereto.

Figure 4:
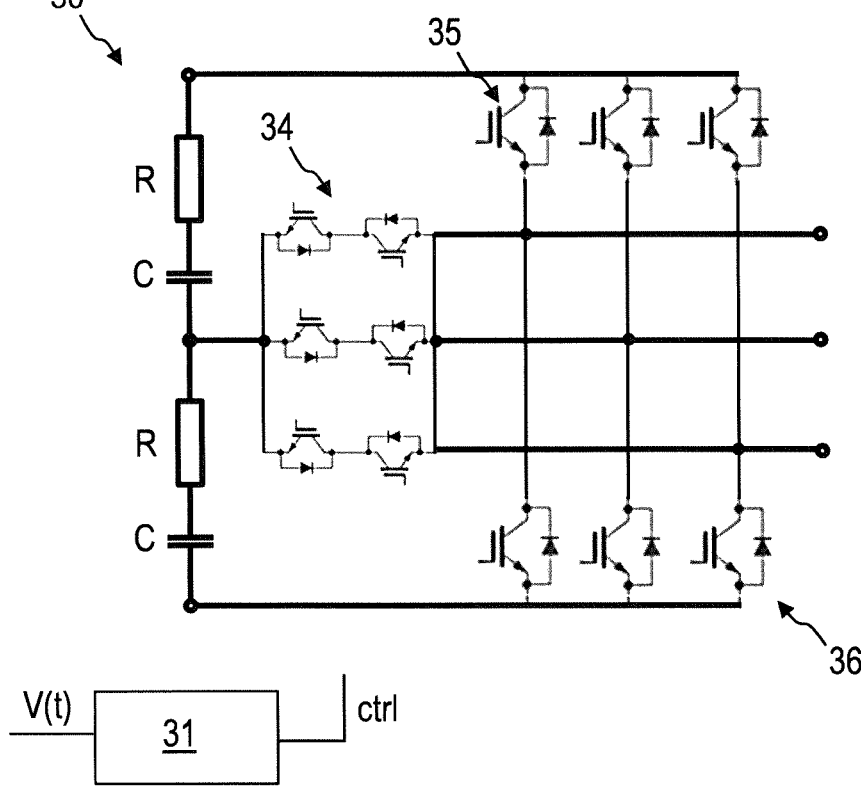
FIG. 4 is a circuit diagram of a converter circuit of a converter according to an embodiment.

FIG. 4 is a circuit diagram of an exemplary converter topology that may be used in the converter circuit 30. The converter circuit 30 can be implemented as three phase three level NPC-type DC-AC inverter, without being limited thereto. Other converter topologies may be used. For illustration, the converter circuit may have other AC/DC, DC/AC, or AC/AC converter topologies.

The converter circuit 30 comprises a plurality of active switching elements 34, 35, 36. The active switching elements 34, 35, 36 are implemented as wide-bandgap semiconductor based switches, such as SiC- or GaN-based semiconductor switches.

The converter circuit 30 has one or several integrated circuit(s) 31. The IC(s) 31 may be implemented by any one or any combination of a processor, a microprocessor, a controller, a microcontroller, an application specific integrated circuit (ASIC), a field programmable gate array (FPGA) or several one of these elements in any combination. The IC(s) 31 may be operative to receive a voltage signal V(t) for each one of the three phases and may process the voltage signal V(t) to compute the THvD. The IC(s) 31 may be operative to generate a control signal that depends at least on the computed THvDs. The control signals may control switching of the active switching elements 34, 35, 36.

The control signals may be generated, based at least on the computed THvD, so as to attain a desired filtering, load balancing, power factor correction, or other function desired for the converter.

The converter 20 preferably does not include any inputs for a wired connection to a current transformer. Control operations are preferably performed based on the THvD measurements that do not require the converter 20 to be connected to a current transformer. In various applications, such as active harmonic filtering or load balancing, no current measurements may be used at all for controlling operation of the converter 20.

In some applications, such as power factor correction (PFC), current measurements or quantities derived therefrom may be required to operate the converter 20. In order to allow the converter 20 to be still readily installed on a DIN rail without the complexity associated with establishing wired connections with a current transformer, the converter 20 may have a wireless interface.

Figure 5:
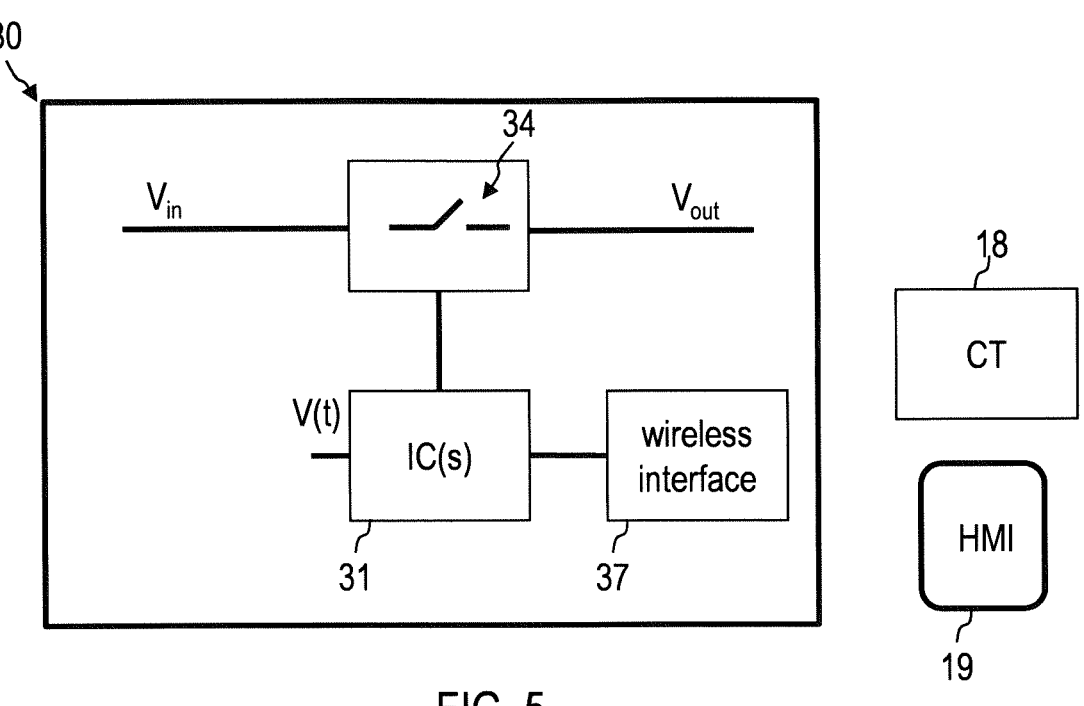
FIG. 5 is a circuit diagram of a converter circuit of a converter according to an embodiment.

FIG. 5 is a schematic representation of a converter circuit 30 according to an embodiment. The converter circuit 30 has a wireless interface 37 accommodated in the housing 20 of the converter. The wireless interface 37 may be a Bluetooth, Bluetooth Low Energy (BLE), cellular communication, and/or Wi-Fi interface, without being limited thereto.

The wireless interface 37 may be adapted for wireless communication with a current transformer (CT) 18. The wireless interface 37 may be adapted to receive current measurements or quantities derived from current measurements, such as a total harmonic current distortion, THiD, measurement, from the CT 18. The converter 20 may be adapted to receive the current or THiD measurement from the CT 18 via a pull or push mechanism. A gateway (not shown) may be provided between the CT 18 and the wireless interface 37 of the converter 20.

When a current measurement or a quantity derived therefrom is processed in the converter circuit 30, the IC(s) 31 may control the wide-bandgap semiconductor based semiconductor switches 32-36 in response to the current or THiD measurement.

The wireless interface 37 may also be used when no current measurements are performed and/or when no THiD measurement is required. For illustration, the converter 20 may be adapted to output operational data or information derived therefrom via the wireless interface 37. The operational data or information derived therefrom may be processed further and/or may be output, after further processing, via a human-machine interface (HMI) 19. The HMI 19 may be provided separately from the converter 20, and no graphic user interface may need to be provided on the converter 20.

The converter 20 may be used in an active harmonic filter (AHV) and/or in a battery energy storage system (BESS). An AHV or BESS according to the invention comprises the converter 20 according to the invention. The converter 20 may be installed in a wall-mounted cabinet on a DIN rail arranged therein, without being limited thereto.

As will be explained in more detail with reference to FIG. 6, the converter 20 may be used in a decentralized application. Many converters having a configuration as explained with reference to FIGS. 1 to 5 may be deployed throughout low voltage (LV) switchgear.

The converter 20 is suitable for low voltage switchgear, which may be wall-mounted or provided in other cabinets. The converter 20 is a wide-bandgap semiconductor based DIN-rail type converter that does not need a wired connection with a CT. The converter is suitable for LV power quality and energy storage market, especially in the residential, commercial and small-medium industrial segments.

The small footprint of the converter 20 facilitates installation on DIN rails in cabinets that do not require dedicated layouts. The converter 20 thus lends itself for distributed systems in which a plurality of converters 20 are arranged on the LV side close to loads/consumers for, e.g., filtering.

Figure 6:
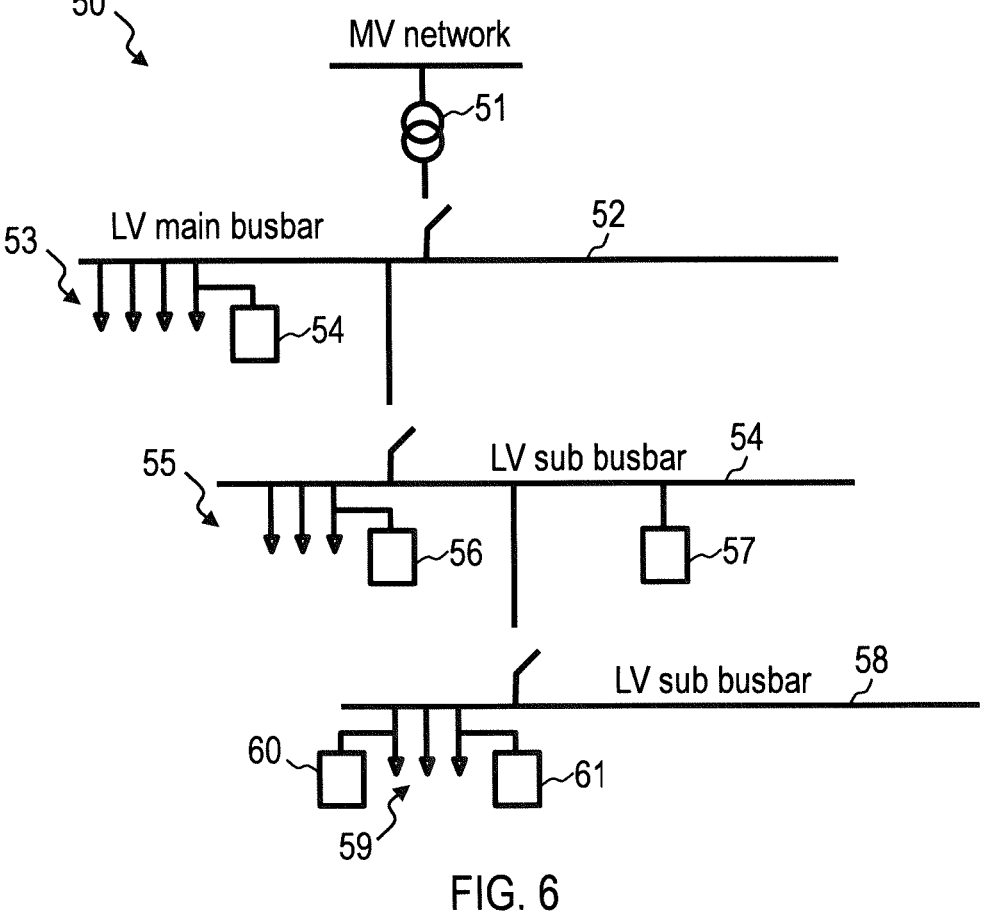
FIG. 6 is schematic view of a power system according to an embodiment.

FIG. 6 shows a system 50 having a distribution transformer 51. Loads 53 may be connected to a LV main busbar 52. A converter 54 according to an embodiment of the invention may be connected to at least one of the loads 53.

Loads 55, 58 may be connected to LV sub busbars 54, 58. Converters 56, 57, 60, 61 according to an embodiment of the invention may be connected to at least some of the loads 55, 59 and/or to the LV sub busbars 54, 58.

Thus, plural converters 54, 56, 57, 60, 61 having a configuration as described with reference to FIGS. 1 to 5 may be deployed throughout the LV switchgear. At least some of the converters may be positioned downstream of individual feeders.

As has been explained above, the converters 54, 56, 57, 60, 61 do not need a wired connection to a CT. The challenges associated with installing current transformers that could provide feedback downstream of feeders are mitigated. A de-centralized converter arrangement having many converters 54, 56, 57, 60, 61 provided close to loads can be implemented.

Thus, the converter according to the invention lends itself to being used in a de-centralized arrangement, where the converter is next to a source of pollution (e.g., next to a source of harmonic distortion).

The converter can be integrated into an existing panel by mounting it to a DIN rail, without requiring an additional cabinet.

The converter does not require CT feedback or at least does not require a wired connection to a CT.

Figure 7:
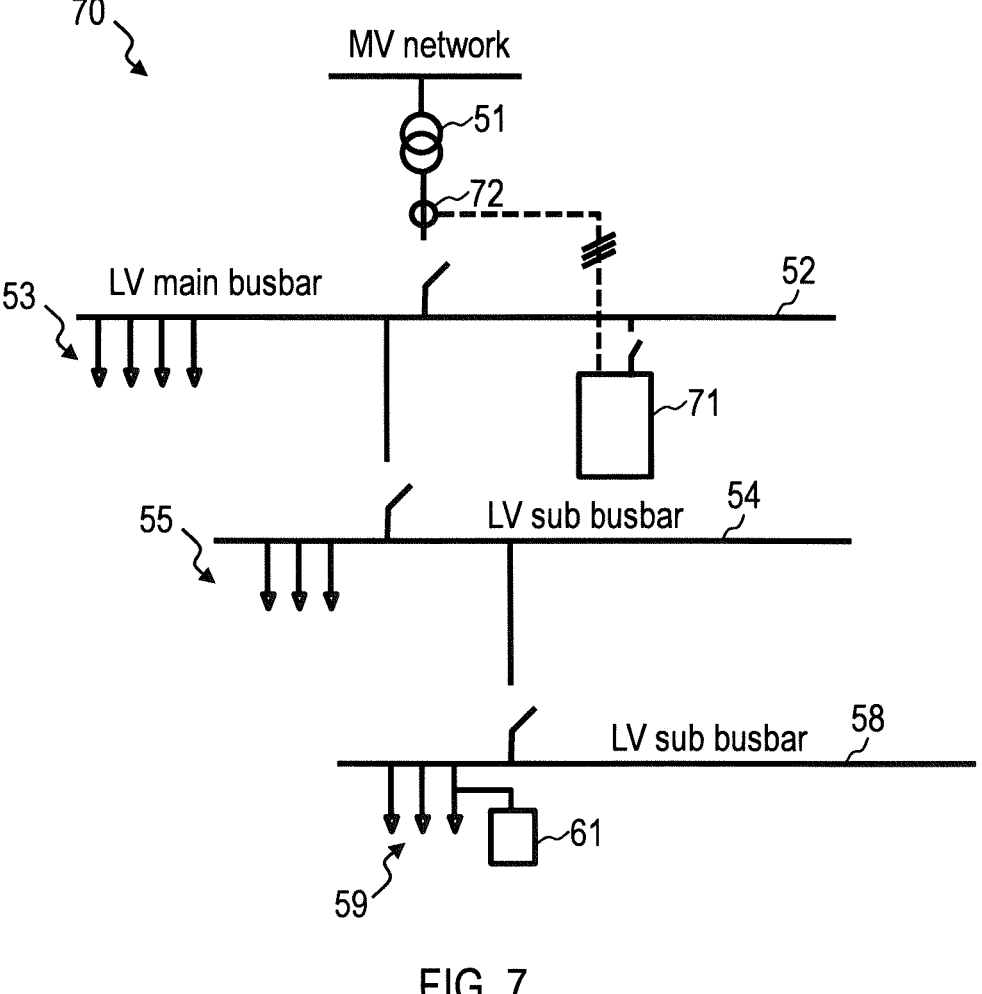
FIG. 7 is a schematic view of a conventional power system.

FIG. 7 illustrates a conventional arrangement where an active filter 71 is provided in a centralized manner. The active filter 71 received wired feedback from a CT 72. The active filter 71 required a large panel in its own cabinet. The active filter 71 is not capable of filtering currents further downstream in the LV switchgear.

Various effects and advantages are attained by the converter 20 according to embodiments of the present disclosure.

The converter 20 can be provided with more compact dimensions thanks to higher switching frequencies. Active switching elements of the wide-bandgap semiconductor based converters can be switched at higher frequencies of, e.g., 10 kHz or more or 40 kHz or more, without being limited thereto. Higher switching frequency allows the passive components to have a smaller geometrical size. This renders the complete converter circuit 30 to be small enough to fit into a DIN-rail type housing 21, which may be a plastic box. The housing 21 may have a maximum edge length of 20 cm or less.

The converter 20 allows higher order harmonics to be filtered. This allows lower losses on passive components. The overall efficiency is improved.

For many applications, no CT must be used. Filtering can be performed based on THvD measurement via power cable connections. The installation of the converter 20 is simplified. No dedicated commissioning engineer is required for the installation.

If a CT feedback is required for, e.g., PFC, this can be accommodated without requiring wired connections. For illustration, when closed-loop operation is required, typically for power factor correction applications, the current feedback can be received from a circuit breaker (CB) via the wireless interface 37.

THiD filtering performance is improved. For illustration, due to the wider filtering spectrum, less than 1% THiD may be attainable.

The converter 20 may have a rating that supports decentralized uses in which plural converters 20 are distributed throughout the LV switchgear. Positioning the converters 20 closer to polluter loads improves the filtering efficiency.

Installation of the converter 20 does not require a special rail or cabinet design. This reduces the total footprint and installation time and cost. The converter 20 can be installed in a wide variety of different LV switchgear, independent from the brand or manufacturer.

Plural converters 20 according to the invention may be installed in parallel.

Thanks to the compact dimensions and lower heat dissipation and ease of mounting by means of a snap-fit connection that does not require dedicated tools, the converter 20 provides ease of integrated into residential, commercial, or industrial switchgears.

Operational data, status information, alerts, or other information may be output by the converter 20 via the wireless interface 37 for displaying on the HMI 19, possibly after further processing. The HMI 19 may be integrated in mobile computing terminals or mobile communication equipment. No dedicated screen needs to be provided on the converter 20.

The wide-bandgap semiconductor based converter 20 has compact dimensions, while being capable of performing a CT-free sensor-less operation in at least some applications.

With one type of the wide-bandgap semiconductor based converter 20 being suitable for easy installation in a wide variety of LV switchgear panels without requiring dedicated rails and/or cabinets, the manufacture, stock keeping and/or delivery of the wide-bandgap semiconductor based converter 20 is simplified.

The converter 20 can be installed into various conventional switchgear panels having DIN rails. The heat sink is not too heavy and bulky and no special rails are required.

The same type of the wide-bandgap semiconductor based converter 20 can be used in various applications as harmonic filtering, power factor correction, load balancing and battery energy storage.

While the present disclosure has been described in detail in the drawings and foregoing description, such description is to be considered illustrative or exemplary and not restrictive. Variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

The invention claimed is:

1. A converter, comprising:
a housing having a mounting structure for mounting the converter to a DIN rail; and
a converter circuit disposed within the housing and comprising one or more wide-bandgap semiconductor based active switching element(s), wherein the converter circuit is configured to determine a total harmonic voltage distortion (THvD) from voltage measurements and to generate one or more control signals to control the one or more wide-bandgap semiconductor based active switching element(s), wherein the one or more control signals are generated based on the determined THvD and without using any current measurements, and wherein the converter circuit is configured for current transformer (CT)-free sensor-less operation and lacks any terminal or interface configured to receive a current measurement or total harmonic current distortion (THiD) measurement from a CT via a wired or wireless connection.

2. The converter of claim 1, wherein the converter circuit comprises a wireless interface, wherein the wireless interface comprises a Bluetooth, Bluetooth Low Energy, or Wi-Fi interface.

3. The converter of claim 2, wherein the wireless interface is configured to output data for outputting via a human-machine interface.

4. The converter of claim 2, wherein the converter comprises a control circuit configured to control switching of the one or more wide-bandgap semiconductor based active switching element(s) based on the determined THvD and independently of a THiD measurement.

5. The converter of claim 1, wherein the converter is a bidirectional converter.

6. The converter of claim 1, wherein the mounting structure is configured for mechanical engagement with a DIN rail selected from a group consisting of a top hat rail, a C section rail, and a G section rail.

7. The converter of claim 6, wherein the mounting structure is configured for mechanical engagement with both a first DIN rail and a second DIN rail, the first and second DIN rails being different from each other and both the first and the second DIN rail being selected from the group consisting of a top hat rail, a C section rail, and a G section rail.

8. An active harmonic filter, power factor correction circuit, load balance circuit, or battery energy storage system, comprising:
a DIN rail and
the converter of claim 1 mounted on the DIN rail.

9. The active harmonic filter, power factor correction circuit, load balance circuit, or battery energy storage system of claim 8, wherein the converter is installed in a wall-mounted unit.

10. A power system, comprising:
a bus;
a plurality of loads coupled to the bus; and
a plurality of converters of claim 1 connected to several of the loads.

11. A power system architecture comprising at least one converter according to claim 1, wherein at least one of the following applies:
the converter is capable of being mounted to an existing panel having a DIN rail by mounting the converter to the DIN rail;
installation of the converter can be performed without establishing a wired connection to a current transformer;
the converter is capable of being mounted to an existing low voltage panel without requiring a dedicated heat dissipation mechanism;
the converter is capable of being mounted close to a distortion source, optionally wherein the distortion source is a load that generates harmonic or reactive power; or
the converter is arranged in a de-centralized converter arrangement, to reduce or eliminate harmonics and reactive power flowing and/or to increase power quality.

12. The converter of claim 1, wherein the converter is configured to operate in an active harmonic filter, power factor correction circuit, load balance circuit, or battery energy storage system.

13. The converter of claim 12, wherein the converter further comprises a wireless interface, wherein the wireless interface comprises a Bluetooth, Bluetooth Low Energy, or Wi-Fi interface.

14. The converter of claim 12, wherein the converter further comprises a control circuit configured to control switching of the wide-bandgap semiconductor based active switching element(s) based on the determined THvD and independently of a THiD measurement.

15. The converter of claim 12, wherein the converter is a bidirectional converter.

16. The converter of claim 12, wherein the mounting structure is configured for mechanical engagement with a DIN rail selected from a group consisting of a top hat rail, a C section rail, and a G section rail.

17. The converter of claim 12, wherein the mounting structure is configured for mechanical engagement with both a first DIN rail and a second DIN rail, the first and second DIN rails being different from each other and both the first and the second DIN rail being selected from the group consisting of a top hat rail, a C section rail, and a G section rail.

18. A method of installing an active harmonic filter, power factor correction circuit, load balance circuit, or battery energy storage system, the method comprising:
providing a DIN rail; and
mounting a converter to the DIN rail, wherein the converter comprises a housing comprising a mounting structure, and a converter circuit disposed within the housing and comprising one or more wide-bandgap semiconductor based active switching element(s), wherein the converter circuit is configured to determine a total harmonic voltage distortion (THvD) and to generate one or more control signals to control the one or more wide-bandgap semiconductor based active switching element(s), wherein the one or more control signals are generated based on the determined THvD and without using any current measurements, and wherein the converter circuit is configured for current transformer (CT)-free sensor-less operation and lacks any terminal or interface configured to receive a current measurement or total harmonic current distortion (THiD) measurement from a CT via a wired or wireless connection, wherein mounting the converter to the DIN rail comprises engaging the mounting structure with the DIN rail.

19. The method of claim 18, wherein the converter comprises:

at least one integrated circuit configured to receive a time-dependent voltage, to compute the THvD, and to generate the one or more control signals for the one or more wide-bandgap semiconductor based active switching element(s) that depend at least on the computed THvD to perform a control function.

\* \* \* \* \*